United States Patent
Chen et al.

(10) Patent No.: US 9,418,567 B1
(45) Date of Patent: Aug. 16, 2016

(54) SELECTING QUESTIONS FOR A CHALLENGE-RESPONSE TEST

(71) Applicant: Google Inc., Mountain View, CA (US)

(72) Inventors: Johnny Chen, Sunnyvale, CA (US); Warren H. Y. Shen, San Jose, CA (US)

(73) Assignee: Google Inc., Mountain View, CA (US)

( * ) Notice: Subject to any disclaimer, the term of this patent is extended or adjusted under 35 U.S.C. 154(b) by 261 days.

(21) Appl. No.: 14/260,204

(22) Filed: Apr. 23, 2014

(51) Int. Cl.
*H04L 29/06* (2006.01)
*G09B 7/06* (2006.01)

(52) U.S. Cl.
CPC .................................... *G09B 7/06* (2013.01)

(58) Field of Classification Search
CPC ............ G09B 7/06; G06F 21/30; G06F 21/31
USPC .......................................................... 726/28
See application file for complete search history.

(56) References Cited

U.S. PATENT DOCUMENTS

| | | | |
|---|---|---|---|
| 8,301,684 B2 | 10/2012 | Mitchell et al. | |
| 8,370,926 B1 | 2/2013 | Satish | |
| 2010/0114776 A1* | 5/2010 | Weller | G06F 21/31 705/44 |
| 2011/0029436 A1* | 2/2011 | Norvell | G06F 21/31 705/67 |
| 2011/0150267 A1* | 6/2011 | Snelling | G06F 21/316 382/100 |
| 2013/0160098 A1* | 6/2013 | Carlson | G06F 21/45 726/6 |
| 2013/0247212 A1* | 9/2013 | Muriello | G06F 21/60 726/26 |
| 2014/0020084 A1 | 1/2014 | Gross | |
| 2014/0259130 A1* | 9/2014 | Li | G06F 21/31 726/6 |
| 2015/0026796 A1* | 1/2015 | Alan | G06F 21/31 726/19 |

FOREIGN PATENT DOCUMENTS

WO    WO 2010/101814    9/2010

* cited by examiner

*Primary Examiner* — William Goodchild
(74) *Attorney, Agent, or Firm* — Fish & Richardson P.C.

(57) ABSTRACT

Methods, systems, and apparatus, including compute program products, for selecting a question for a challenge-response test. One of the methods includes obtaining question response pairs, wherein each question response pair includes a question about a first entity and a response to the question. Respective difficulty values for each question response pair are determined from a count of a number of times the question in the question response pair has been submitted as a search query to a search engine by users of the search engine. A request for a challenge-response test is received, wherein the request includes a context for the challenge-response test. Difficulty criteria for the challenge-response test are determined from the context. A first question response pair is selected that has a difficulty value that satisfies the difficulty criteria for the challenge-response test, the question from the first question response pair is provided in response to the request.

20 Claims, 3 Drawing Sheets

SELECTING QUESTIONS FOR A CHALLENGE-RESPONSE TEST

BACKGROUND

This specification relates to challenge-response tests.

Challenge-response tests aim to distinguish real users, i.e., humans, from computer programs. Some challenge-response tests that exist show a user a distorted image of text and ask the user to enter the text in the image. The image of the text is selected so that it would be difficult for a computer program to automatically correctly decipher the text correctly, e.g., using an Optical Character Recognition (OCR) technique. Some challenge-response tests provide the user with images where the correct text in the image is unknown to the providing system, e.g., along with an image where the correct text in the image is known to the system. The system can use user responses that identify the text in the image to determine how to correctly decipher the image text.

SUMMARY

This specification describes technologies that relate to selecting questions for a challenge-response test.

In general, one innovative aspect of the subject matter described in this specification can be embodied in methods that include the actions of obtaining a plurality of question response pairs, wherein each question response pair includes a respective question about a respective first entity and a respective response to the question that is an attribute value associated with the respective entity or a reference to a respective second entity that has a relationship to the first entity; determining a respective difficulty value for each question response pair from a count of a number of times the question in the question response pair has been submitted as a search query to a search engine by users of the search engine; receiving a request for a challenge-response test, wherein the request includes a context for the challenge-response test; determining difficulty criteria for the challenge-response test from the context; selecting a first question response pair that has a difficulty value that satisfies the difficulty criteria for the challenge-response test; and providing the question from the first question response pair in response to the request.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. Selecting the first question response pair comprises: selecting a plurality of candidate question response pairs, each candidate question response pair having a difficulty value that satisfies the difficulty criteria for the challenge-response test; generating one or more additional criteria for the challenge-response test from the context; and selecting the first question response pair based on the first question response pair satisfying the one or more additional criteria. Generating the one or more additional comprises: obtaining user data using the context for the challenge-response test; identifying, from the user data, one or more topics of interest; and generating an additional criterion that specifies that the challenge-response test be relevant to one of the topics of interest. Generating the one or more additional criteria comprises: determining a language of a user interface in which the challenge-response is presented from the received context; generating an additional criterion that specifies that the challenge-response test be in the language of the user interface. Generating the one or more additional criteria comprises: determining a language of a user interface in which the challenge-response is presented from the received context; obtaining user data using the received context; identifying, from the user data, a user spoken language; determining that the language of the user interface and the user spoken language are different; and in response to determining that the language of the user interface and the user spoken language are different, generating an additional criterion that specifies that the challenge-response test be in the user spoken language. Generating the one or more additional criteria comprises: obtaining a normal location of a user from the context; and generating an additional criterion that specifies that the challenge-response test be relevant to the normal location. Determining difficulty criteria from the context comprises: determining a first type of user request that triggered the presentation of the challenge-response test; accessing data that maps each of a plurality of types of user requests to respective difficulty criteria; and identifying the difficulty criteria that are mapped to the first type of user request. The actions include obtaining a plurality of unanswered questions, wherein each unanswered question is a question about an entity that has an unknown response; selecting an unanswered question from the plurality of unanswered questions using the context; providing the selected unanswered question with the question from the first question response pair in response to the request; receiving a first user response to the selected unanswered question and a second user response to the question from the first question response pair; and using the first and second responses to determine a correct response to the unanswered question. The actions include generating the plurality of unanswered questions by analyzing a structured database of structured data that includes nodes that represent entities, links between nodes that represent relationships between entities represented by the nodes, and links between nodes representing entities and data representing attribute values of the entities, and wherein analyzing the structured database comprises: analyzing the structured database to identify links that are incomplete. The actions include generating the plurality of unanswered questions by analyzing a structured database of structured data that includes nodes that represent entities, links between nodes that represent relationships between entities represented by the nodes, and links between nodes representing entities and data representing attribute values of the entities, and wherein analyzing the structured database comprises: applying pre-determined templates to the links in the structured database.

The subject matter described in this specification can be implemented in particular embodiments so as to realize one or more of the following advantages. A system can provide a challenge-response test that includes a question likely to be relevant to a user, making answering challenge-response test questions more enjoyable for the user. The question can be specific to either a user's interests or location, and help preclude a fraudulent user or simulated user, e.g., a computer program, from easily being able to pass the challenge-response test. Furthermore, answers received from users to challenge-response test questions for which the response is not known can be used by the system to learn the correct response to the questions. For example, a database that stores information about entities can be updated with previously unknown information about entity attribute values or relationships between entities from user answers to challenge-response test questions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
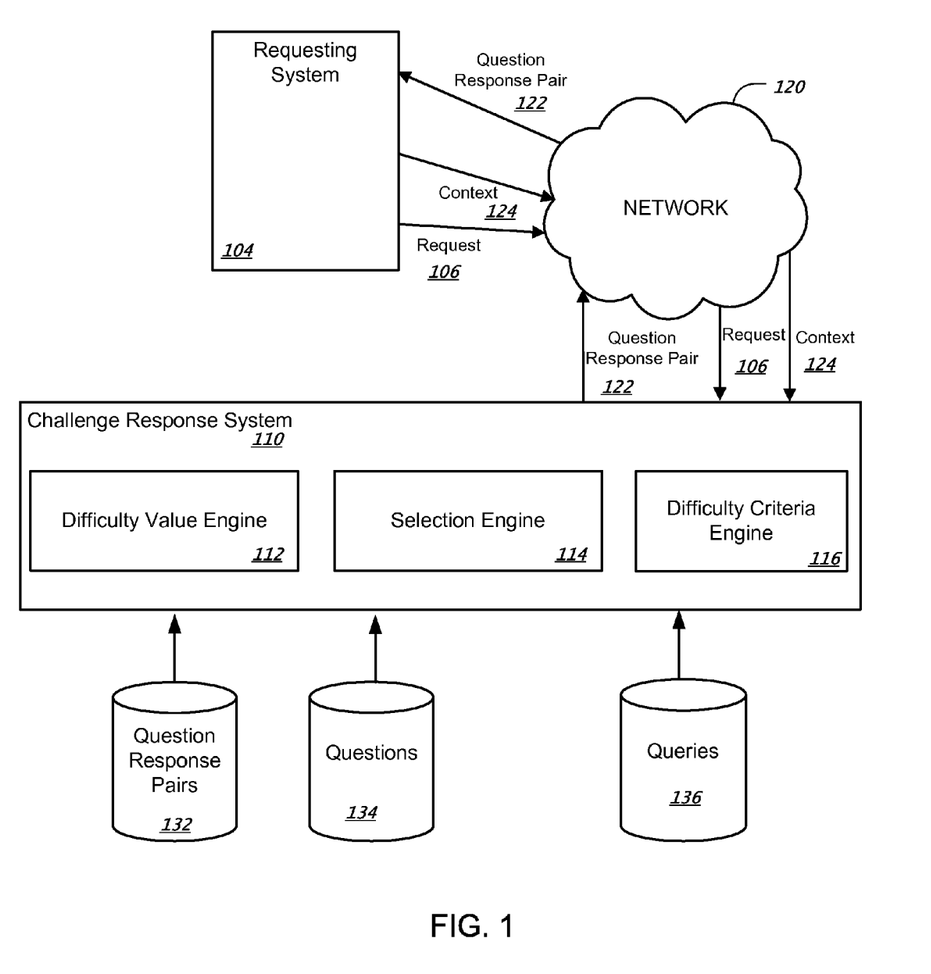
FIG. 1 shows an example challenge-response test system.

FIG. 1 shows an example challenge-response test system 110. The challenge-response test system 110 is an example of a system implemented as computer programs on one or more computers in one or more locations, in which the systems, components, and techniques described below, can be implemented.

The challenge-response test system 110 receives requests for challenge-response tests from requesting systems, e.g., requesting system 104. In response to each request, the challenge-response test system 110 selects a question response pair, and provides the question from the question response pair to the requesting system 104. The requesting system 104 can interact with the challenge-response test system 110 to request a challenge-response test through a data communication network 120, e.g., local area network (LAN) or wide area network (WAN), e.g., the Internet, or a combination of networks, any of which may include wireless links. The requesting system 104 may be, e.g., a system that provides email service to users, a bank that provides financial account information, a social network, a search engine that maintains user accounts for users of the search engine, or any other system that may find it beneficial to distinguish human users from computer programs posing as human users.

The requesting system 104 can request a challenge-response test from the challenge-response test system 110 by submitting a request 106 to the challenge-response test system. The challenge-response test system 110 can receive a context 124 for the request, i.e., the particular context in which the requestor system 104 is requesting a challenge-response test.

The challenge-response test system 110 includes or has access to a question response pair database 132 that stores question response pairs. That is, the question response pair database 132 stores questions about entities and, for each question, a known correct response to the question. For example, one of the questions can be "What film did Example Actress win a best actress award for?" with a mapped response, "Example Film." In this specification, the term "database" will be used broadly to refer to any collection of data: the data does not need to be structured in any particular way, or structured at all, and it can be stored on storage devices in one or more locations. Thus, for example, the question response pair database 132 can include multiple collections of data, each of which may be organized and accessed differently.

The question response pairs stored in the database 132 can be generated from a database that stores information about entities, e.g., a database of structured data, e.g., a graph database that includes nodes that represent entities and identifies the type of each entity represented by a node. The database of structured data also includes links between nodes that represent relationships between entities, with the type of the link between two nodes identifying the type of relationship that exists between the entities represented by the nodes. Similarly, the database includes links between nodes representing entities and data representing attribute values of the entity, with the type of the link identifying the attribute. An example of an online database of structured data that exists is the FREEBASE database that is accessible on the Internet at www.freebase.com. In some implementations the database of structured data can be a table that maps an entity to another entity, and includes a relationship between them. Other sources can include online encyclopedias having pages directed to each of a group of entities and websites directed to particular types of entities, e.g., a website that includes resources directed to movies and movie-related entities, e.g., actors, directors, and producers.

In some implementations, the challenge-response test system 110 analyzes the database of structured data to generate the question response pairs and then stores the pairs in the question response pair database 132. For example, the challenge-response test system 110 can generate the questions by applying pre-determined templates to links in the database. The templates may be specific to the type of the link and to the types of the entity or entities represented by the nodes that are connected by the link. Similarly, some templates may be specific to links that link a node representing an entity to data representing an attribute value associated with the entity. For example, one of the templates may indicate that for a link that links a node representing a first entity of the type "person" to data representing a value of a "height" attribute of the first entity, the question should take the form of "How tall is _?," where the blank is a name of the first entity and the response to the question is the attribute value.

In some implementations, the challenge-response test system 110 can apply the templates only to certain links in the database of structure data to generate question response pairs. For example, the challenge-response test system 110 can access data that identifies particularly popular subjects, e.g., actors, sports, and so on, and only apply templates to links that are relevant to those particular popular subjects. As another example, the challenge-response test system 110 can determine popular subjects from search queries that have been submitted to a search engine. For example, the challenge-response test system 110 can access a query database 136, e.g., a database that stores data identifying search queries submitted to a search engine by users of the search engine and, for each search query, a count of the number of times the search query has been submitted to the search engine. From the search queries in the query database 136, the challenge-response test system 110 can determine relationships or attributes that are frequently identified in search queries submitted to the search engine. The system can then identify those relationships or attributes as being particularly popular subjects and apply the templates to links that identify that type of relationship or attribute.

Additionally, the challenge-response test system 110 can include or have access to a question database 134 that stores questions about entities that do not have known responses, referred to in this specification as "unanswered questions." For instance, entities represented by nodes in the database of structure data, described above, can be assigned certain default attributes in the database of structured data. The default attributes may be specific to the type of the entity. For example, entities of the type "person" can be assigned default attributes that include where they were born, their profession, their age, political leanings, major accomplishments, their spouse, and so on. For some entities, values for certain ones of the attributes may not be stored in the structured database. That is, certain links in the database that link a node representing an entity to another entity that has a specified relationship with the entity may be incomplete, e.g., because the other entity that has the specified relationship with the entity is not known, i.e., is not identified in the link. Similarly, certain links in the database that link a node representing an entity to data representing a value of a certain attribute may be incomplete, e.g., because the value of the attribute for the entity is not known, i.e., is not present in the structured database. Therefore, for certain entities identified in the database of structured data, questions can be formed but no responses to the respective questions exist in the database of structured data. The challenge-response test system 110 can analyze the database of structured data and identify entities that are represented by nodes in the entity and that have incomplete relationship information or incomplete attribute information. The challenge-response test system can then generate unanswered questions about those entities, e.g., by applying the pre-determined templates described above. The challenge-response test system 110 can provide the unanswered questions to users to receive user responses and can update the question database 134 based on the user response. Providing unanswered questions is described below with reference to FIG. 3.

The challenge-response test system 110 includes a difficulty value engine 112 that assigns a difficulty value to question response pairs from the question response pair database 132. In order to assign difficulty values to question response pairs, the difficulty value engine 112 determines how frequently the question in the question response pair has been submitted as a search query to a search engine, e.g., by accessing the query database 136. Determining a difficulty value from data stored in a query database is described in more detail below with reference to FIG. 2.

The challenge-response test system 110 also includes a difficulty criteria engine 116 that determines difficulty criteria from a received context 124 for the test request and a selection engine 114 that selects a question response pair from the question response pair database 132 using the difficulty criteria and the context 124. In some cases, the selection engine 114 can also select an unanswered question from the question database 134 using the context 124. Determining difficulty criteria and selecting a question response pair is described in more detail below with reference to FIG. 2. Selecting an unanswered question is described in more detail below with reference to FIG. 3.

In this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

Figure 2:
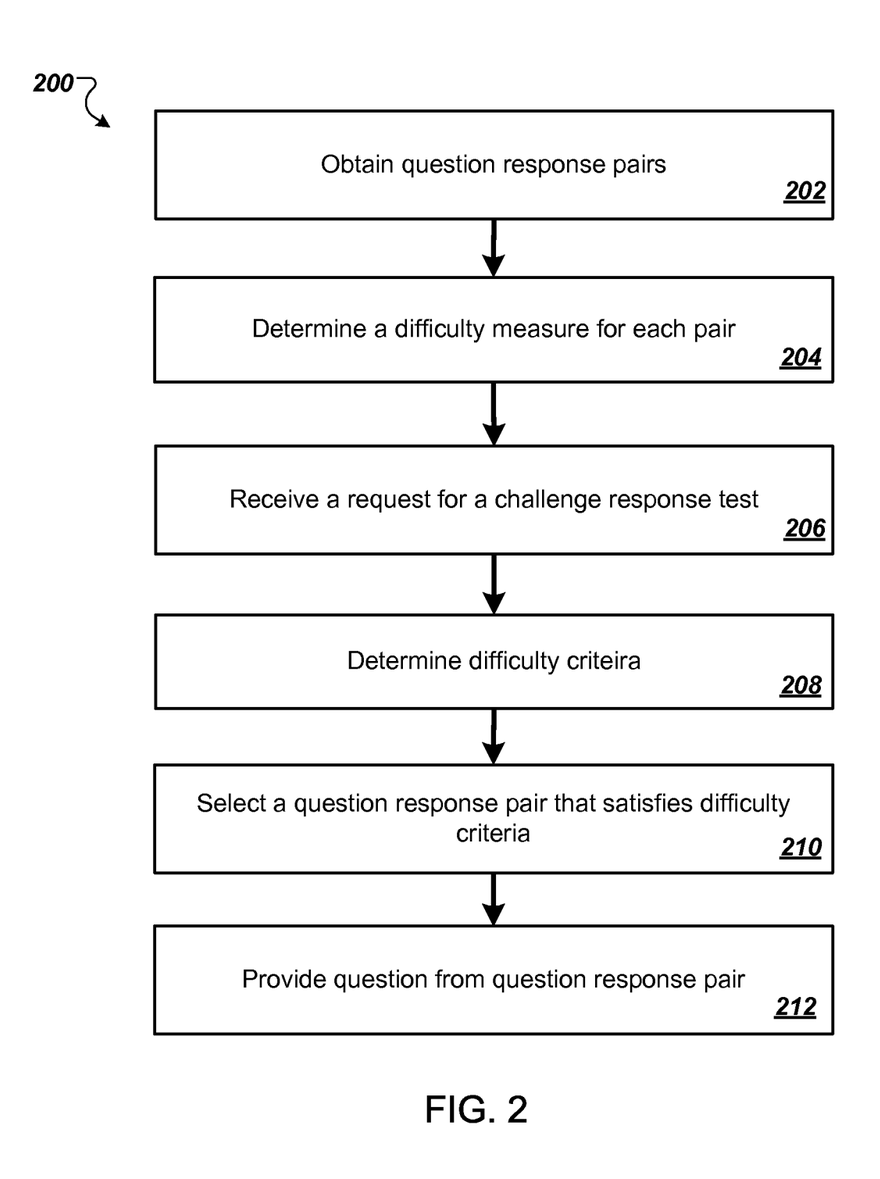
FIG. 2 is a flow diagram of an example process of selecting a question response pair using context.

FIG. 2 is a flow diagram of an example process of selecting a question response pair using context. For convenience, the process 200 will be described as being performed by a system of one or more computers located in one or more locations. For example, a challenge-response test system, e.g., the challenge-response test system 110 of FIG. 1, appropriately programmed in accordance with this specification, can perform the process 200.

The system obtains question response pairs (step 202). For example, the system can obtain the question response pairs from a question response pair database, e.g., the question response pair database 132 of FIG. 1.

The system determines a difficulty value for each question response pair (step 204). The difficulty value for a given question response pair is a value that measures the difficulty of answering the question in the question response pair for a human user, i.e., the difficulty of providing a correct response to the question for the human user. The difficulty value can be computed from a count of the number of times the question has been submitted to a search engine as a search query. For example, the system can access a query database, e.g., the query database 136 of FIG. 1, and, for each question response pair, identify one or more search queries in the query database that match the question in the question response pair. The system can determine that a search query matches the question in any of a variety of ways. For example, the system can determine that a question matches a search query if more than a threshold number, or threshold proportion, of the terms in the question matches a term in the search query. As another example, prior to making the determination, the system can add known synonyms of words in the search query to the search query, known synonyms of words in the question to the question, or both. As another example, the system can remove stop words or adjust declensions of nouns prior to matching.

In some implementations, the difficulty value is inversely proportional to the count of the number of times a question has been submitted to a search engine. That is, the difficulty value is higher when the count is lower, and lower when the count is higher. Thus, questions that have been submitted as search queries more frequently are considered less difficult to answer, while questions that have been submitted as search less frequently are considered more difficult to answer. For example, the difficulty value for a given question answer pair can be equal or proportional to $1/TC$, where TC is the total count of the number of times each search query that matches the question in the question answer pair has been submitted as a search query. In some other implementations, the difficulty value for a given question answer pair is proportional to a sigmoid function of the total count or to a logarithmic function of the total count.

In some implementations, instead of or in addition to computing the difficulty value for a question response pair from the number of times the question has been submitted to a search engine, the system computes a difficulty value for the question response pair from a count of the number of times the question response pair is identified in web resources that have been classified as resources that provide answers to questions, e.g., that aggregate answers to questions posed by users. For example, the system can determine the count for the question response pair by accessing a fact database, e.g., a database that includes the number of times a fact is included in websites that have been classified as providing answers to questions. The fact database can include facts and, for each fact, a total count of the number of times the fact appears in question answer web resources. The system can determine that a fact in the fact database matches the question response pair when the fact includes both the entity in the question of the question response pair and the entity or attribute value in the response of the question response pair. As described above, the difficulty value can be inversely proportional to the total count or to a function of the total count. In implementations when the system computes one difficulty value from the data in the query database and another difficulty value from the data in the fact database, the system can combine the two difficulty values to generate a final difficulty value for the question response pair, e.g., by weighting each difficulty value or by averaging the two difficulty values.

The system receives a request for a challenge-response test from a requesting system (step 206). The request includes a context for the request, i.e., data defining the context in which the requested challenge-response test is to be provided to a user. For instance, the context can identify the type of user request that triggered the presentation of the challenge-response test to the user. For example, the user can be attempting to access his/her email, attempting to sign up for an account on a website, retrieving a password after several incorrect password submission attempts, logging in from a location different than normal, and so on. In some implementations, instead of or in addition to the trigger data, the context can include difficulty criteria for the challenge-response test. For example, the context can specify that the challenge-response test include a question response pair with a level of difficulty, e.g., a question response pair that has roughly a particular difficulty value, a question response pair that has a difficulty value that is within a difficulty value range, or a question response pair with a particular difficulty label, e.g., 'hard', 'medium', or 'easy' difficulty.

The system determines difficulty criteria for the request from the received context (step 208). For example, the system can assign a difficulty value to the request, assign a range of difficulty values to the request, or assign a difficulty label to the request that can be mapped to a range of difficulty values. As described above, in some cases, the context includes data defining the difficulty criteria.

If the context does not include difficulty criteria for the request, the system can determine the difficulty criteria from the type of user request identified in the context. In order to determine difficulty criteria from user request types, the system may have access to data that maps user request types to difficulty values, difficulty value ranges, or difficulty labels. For example, the data may map a user account password reset request type to a "hard" difficulty label while mapping a user request to log in from an unfamiliar location to an "easy" difficulty label. In some implementations, if the context does not identify the user request type, the system can determine the user request type from the uniform resource locator ("URL") or other identifier for the system that the request was received from or is to be provided to. For instance, if the system receives a request to provide a challenge-response test to a webpage URL that is known to the system to be provided to users to reset a password, the system can identify the user request type as being a user account password reset request type. If the context does not identify difficulty criteria or a user request type and the system is unable to otherwise determine the user request type, the system can assign a default difficulty label to the request, e.g., a 'medium' difficulty.

The system selects a question response pair that satisfies the difficulty criteria (step 210). That is, the system selects a question-response pair that has a difficulty value that satisfies the difficulty criteria for the request. In order to select the question-response pair, the system identifies candidate question-response pairs that each have difficulty values that match the difficulty criteria. If the difficulty criteria specify a particular difficulty value, the system selects each question response pair with a difficulty value that matches the particular difficulty value as a candidate question-response pair. If the difficulty criteria specify a range of difficulty values, the system selects each question response pair with a difficulty value within the specified range. If the difficulty criteria specify a difficulty label, the system selects each question response pair that has a difficulty value in a range of difficulty values mapped to the label, e.g., the difficulty label 'easy' can include the lowest 33% or 40% of difficulty values, 'medium' can include the next 33% or 40% of difficulty values, and 'hardest' can include the highest 33% or 20% of difficulty values.

The system can select a question response pair from the identified candidate question response pairs using other information included in the context, e.g., language of the user interface in which the question is to be presented, user data for the user that is to be presented with the challenge response test, or a user identifier to provide to an external system to obtain user data. In order to use the other information in the context to select a candidate question response pair, the system generates additional criteria from the other information and selects a candidate question response pair that satisfies each of the additional criteria. If the system identifies multiple candidate question response pairs that satisfy each additional criterion, it can select from the candidate questions at random.

In the case of the other information including user data, or obtained user data from an external system, an additional criterion may be that the question is relevant to the user data. For example, if the context identifies that the user is attempting to log in from a location, e.g., Syria, different from a normal location, e.g., Paris, the system can select a question relevant to the normal location. For example, the system can select a question that deals with a local politician, e.g., "who is the mayor of Paris?"

As another example, the user data might identify topics of interest for the user. In this case, an additional criterion may be that the question is relevant to the topics of interest. For example, if the user data indicates that the user is interested in cats, the system can then select a question that is about entities of the type cats. That is, the system can identify a question from the question response pair relating to cats.

As another example, the user data might identify languages spoken by the user. In this case, the additional criteria may include a criterion that specifies that the question be in a language spoken by the user. If, as described above, the data includes data identifying the language of the user interface in which the question is to be presented to the user, and the language is not one of the languages spoken by the user, the system may determine that the language spoken by the user criterion overrides a criterion that the language of the question match the presentation language. Thus, a user who is travelling in Spain and presented with an interface in Spanish, may therefore be presented with a question in French if user data for the user indicates the user speaks French but not Spanish.

The system provides the question from the selected question response pair to the requesting system in response to the request (step 212). In some implementations, the system provides the question and the response from the selected question response pair in response to the request, e.g., so that the requesting system can verify whether the response submitted by the user is the correct response. In some other implementations, the system provides the question without providing the response. In these implementations, the requesting system can provide the user response to the system once the response is received, and the system can provide an indication to the requesting system whether the user response matches the correct response to the question.

In some implementations, the system can include in the challenge-response test an unanswered question, i.e., a question to which the correct response is not known by the system, along with a question to which the correct response is known by the system. The system can use user responses to unanswered questions to determine the correct responses to the unanswered questions.

Figure 3:
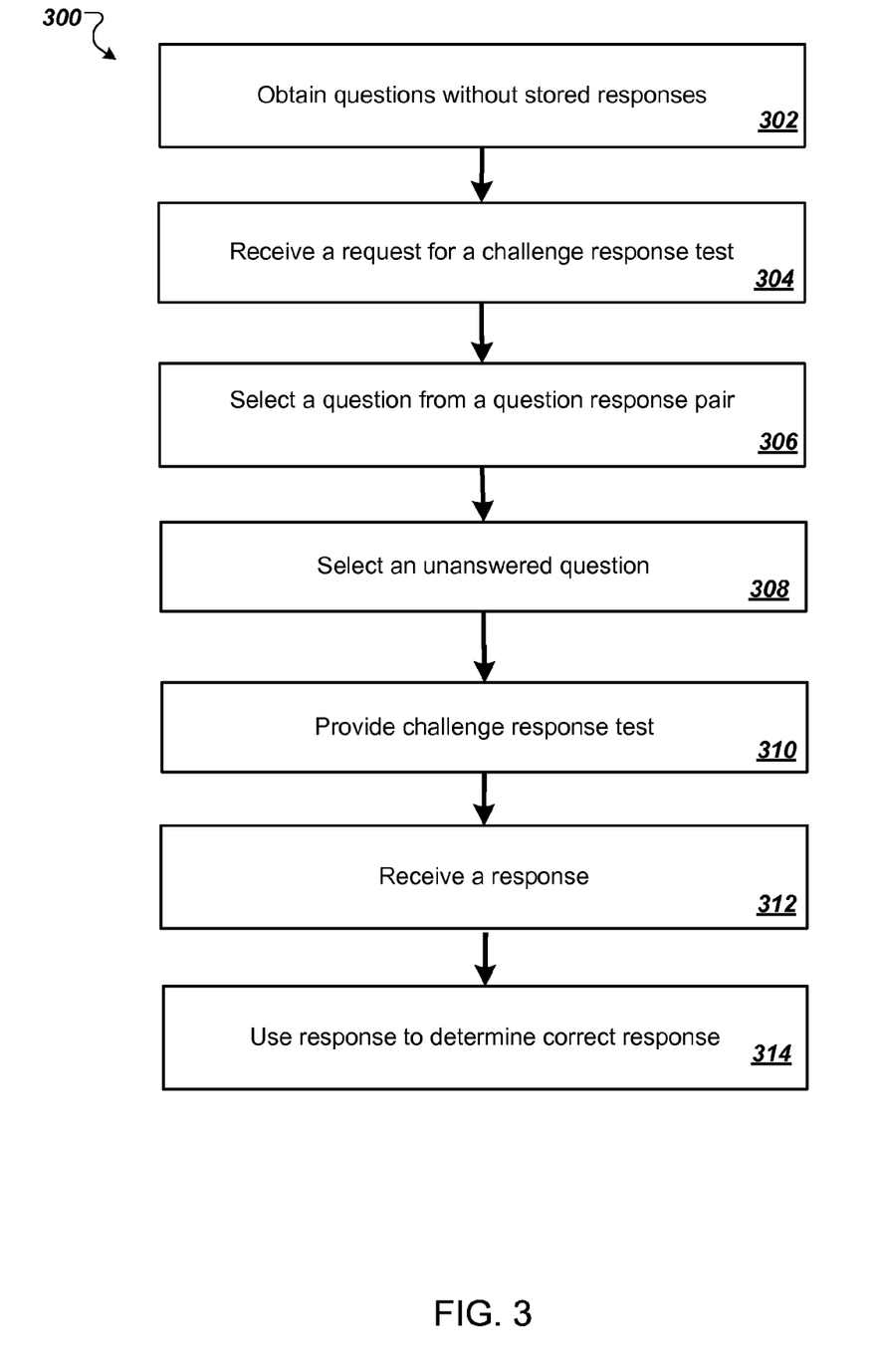
FIG. 3 is a flow diagram of an example process of providing unanswered questions.

FIG. 3 is a flow diagram of an example process of providing unanswered questions. For convenience, the process 300 will be described as being performed by a system of one or more computers located in one or more locations. For example, a challenge-response system, e.g., the challenge-response system 110 of FIG. 1, appropriately programmed in accordance with this specification, can perform the process 300.

The system obtains unanswered questions (step 302) from a question database, e.g., the question database 134 of FIG. 1.

The system receives a request for a challenge-response test from a requesting system (step 304).

The system selects a question response pair in response to the request (step 306). The system can select the question response pair using context received with the request, e.g., as described above with reference to FIG. 2.

The system selects an unanswered question (step 308). The system can select a question that satisfies the additional criteria generated for the request, e.g., as described above with reference to FIG. 2.

The system provides the question from the selected question response pair and the selected unanswered question to the requesting system in response to the request (step 310). The system receives a user response to the challenge-response test (step 312). That is, the system receives two user responses, a user response to the question from the selected question response pair and a user response to the selected unanswered question.

The system uses the user responses in determining the correct response to the unanswered question (step 314). Generally, the system maintains a record of the user responses received for the unanswered question and uses the responses in the record to determine the correct response for to the unanswered question. Initially, however, the system determines whether the user response to the question from the selected question response pair matches the response in the question response pair. In some implementations, upon a positive determination, the system stores the response to the unanswered question in the record and upon a negative determination, the system discards the user response to the unanswered question, i.e., not store the response in the record. In some implementations, the system associates each user response to the unanswered question in the record with a weight. In these implementations, rather than discard the user response upon a negative determination, the system can associate a higher weight with the user response upon a positive determination than upon a negative determination.

In some implementations, if a threshold number or threshold proportion of user responses to an unanswered question in the record are the same response or the weights associated with a response to the unanswered question sum to more than a threshold weight, the system determines that the response to the unanswered question is the correct response to the question.

In some other implementations, the system uses the user responses in combination with other information to determine whether the particular response is the correct answer to the question. For example, the system can obtain data identifying two or more plausible responses to the unanswered question from an external source, and determine whether the user response to the unanswered question identified in the record as being the correct response is included in the plausible responses. If the user response is one of the plausible responses, the system determines that the user response is the correct response to the question. If the user response is not one of the plausible responses, the system refrains from determining that the user response is the correct response to the question.

Once the correct response for the question is determined, the system can update the question database to remove the question and, optionally, can add the question mapped to the correct response to the question response pair database. In some implementations, once a correct response to an unanswered question is determined, the system can update the database of structured data from which the unanswered question was generated with the correct response.

In situations in which the systems discussed here collect personal information about users or make use of personal information about users, the users may be provided with an opportunity to control whether programs or features collect user information (e.g., information about a user's social network, social actions or activities, profession, a user's preferences, a user's search history, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the systems.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:
1. A computer-implemented method comprising:
    obtaining a plurality of question response pairs, wherein each question response pair includes a respective question about a respective first entity and a respective response to the question that is an attribute value asso- ciated with the respective entity or a reference to a respective second entity that has a relationship to the first entity;

determining a respective difficulty value for each question response pair from a count of a number of times the question in the question response pair has been submitted as a search query to a search engine by users of the search engine;

receiving a request for a challenge-response test, wherein the request includes a context for the challenge-response test;

determining difficulty criteria for the challenge-response test from the context;

selecting a first question response pair that has a difficulty value that satisfies the difficulty criteria for the challenge-response test; and providing the question from the first question response pair in response to the request.

2. The method of claim 1, wherein selecting the first question response pair comprises:

selecting a plurality of candidate question response pairs, each candidate question response pair having a difficulty value that satisfies the difficulty criteria for the challenge-response test;

generating one or more additional criteria for the challenge-response test from the context; and selecting the first question response pair based on the first question response pair satisfying the one or more additional criteria.

3. The method of claim 2, wherein generating the one or more additional criteria comprises:

obtaining user data using the context for the challenge-response test;

identifying, from the user data, one or more topics of interest; and generating an additional criterion that specifies that the challenge-response test be relevant to one of the topics of interest.

4. The method of claim 2, wherein generating the one or more additional criteria comprises:

determining a language of a user interface in which the challenge-response is presented from the received context;

generating an additional criterion that specifies that the challenge-response test be in the language of the user interface.

5. The method of claim 2, wherein generating the one or more additional criteria comprises:

determining a language of a user interface in which the challenge-response is presented from the received context;

obtaining user data using the received context;

identifying, from the user data, a user spoken language;

determining that the language of the user interface and the user spoken language are different; and in response to determining that the language of the user interface and the user spoken language are different, generating an additional criterion that specifies that the challenge-response test be in the user spoken language.

6. The method of claim 2, wherein generating the one or more additional criteria comprises:

obtaining a normal location of a user from the context; and generating an additional criterion that specifies that the challenge-response test be relevant to the normal location.

7. The method of claim 1, wherein determining difficulty criteria from the context comprises:

determining a first type of user request that triggered the presentation of the challenge-response test;

accessing data that maps each of a plurality of types of user requests to respective difficulty criteria; and identifying the difficulty criteria that are mapped to the first type of user request.

8. The method of claim 1, further comprising:

obtaining a plurality of unanswered questions, wherein each unanswered question is a question about an entity that has an unknown response;

selecting an unanswered question from the plurality of unanswered questions using the context;

providing the selected unanswered question with the question from the first question response pair in response to the request;

receiving a first user response to the selected unanswered question and a second user response to the question from the first question response pair; and using the first and second responses to determine a correct response to the unanswered question.

9. The method of claim 8, further comprising:

generating the plurality of unanswered questions by analyzing a structured database of structured data that includes nodes that represent entities, links between nodes that represent relationships between entities represented by the nodes, and links between nodes representing entities and data representing attribute values of the entities, and wherein analyzing the structured database comprises:

analyzing the structured database to identify links that are incomplete.

10. The method of claim 8, further comprising:

generating the plurality of unanswered questions by analyzing a structured database of structured data that includes nodes that represent entities, links between nodes that represent relationships between entities represented by the nodes, and links between nodes representing entities and data representing attribute values of the entities, and wherein analyzing the structured database comprises:

applying pre-determined templates to the links in the structured database.

11. A system comprising:

one or more computers and one or more storage devices storing instructions that, when executed by the one or more computers, cause the one or more computers to perform operations comprising:

obtaining a plurality of question response pairs, wherein each question response pair includes a respective question about a respective first entity and a respective response to the question that is an attribute value associated with the respective entity or a reference to a respective second entity that has a relationship to the first entity;

determining a respective difficulty value for each question response pair from a count of a number of times the question in the question response pair has been submitted as a search query to a search engine by users of the search engine;

receiving a request for a challenge-response test, wherein the request includes a context for the challenge-response test;

determining difficulty criteria for the challenge-response test from the context;

selecting a first question response pair that has a difficulty value that satisfies the difficulty criteria for the challenge-response test; and providing the question from the first question response pair in response to the request.

12. The system of claim 11, wherein selecting the first question response pair comprises:
selecting a plurality of candidate question response pairs, each candidate question response pair having a difficulty value that satisfies the difficulty criteria for the challenge-response test;
generating one or more additional criteria for the challenge-response test from the context; and
selecting the first question response pair based on the first question response pair satisfying the one or more additional criteria.

13. The system of claim 12, wherein generating the one or more additional criteria comprises:
obtaining user data using the context for the challenge-response test;
identifying, from the user data, one or more topics of interest; and
generating an additional criterion that specifies that the challenge-response test be relevant to one of the topics of interest.

14. The system of claim 12, wherein generating the one or more additional criteria comprises:
determining a language of a user interface in which the challenge-response is presented from the received context;
generating an additional criterion that specifies that the challenge-response test be in the language of the user interface.

15. The system of claim 12, wherein generating the one or more additional criteria comprises:
determining a language of a user interface in which the challenge-response is presented from the received context;
obtaining user data using the received context;
identifying, from the user data, a user spoken language;
determining that the language of the user interface and the user spoken language are different; and
in response to determining that the language of the user interface and the user spoken language are different, generating an additional criterion that specifies that the challenge-response test be in the user spoken language.

16. The system of claim 12, wherein generating the one or more additional criteria comprises:
obtaining a normal location of a user from the context; and
generating an additional criterion that specifies that the challenge-response test be relevant to the normal location.

17. The system of claim 11, wherein determining difficulty criteria from the context comprises:
determining a first type of user request that triggered the presentation of the challenge-response test;
accessing data that maps each of a plurality of types of user requests to respective difficulty criteria; and
identifying the difficulty criteria that are mapped to the first type of user request.

18. The system of claim 11, wherein the operations further comprise:
obtaining a plurality of unanswered questions, wherein each unanswered question is a question about an entity that has an unknown response;
selecting an unanswered question from the plurality of unanswered questions using the context;
providing the selected unanswered question with the question from the first question response pair in response to the request;
receiving a first user response to the selected unanswered question and a second user response to the question from the first question response pair; and
using the first and second responses to determine a correct response to the unanswered question.

19. A computer program product, encoded on one or more non-transitory computer storage media, comprising instructions that when executed by one or more computers cause the one or more computers to perform operations comprising:
obtaining a plurality of question response pairs, wherein each question response pair includes a respective question about a respective first entity and a respective response to the question that is an attribute value associated with the respective entity or a reference to a respective second entity that has a relationship to the first entity;
determining a respective difficulty value for each question response pair from a count of a number of times the question in the question response pair has been submitted as a search query to a search engine by users of the search engine;
receiving a request for a challenge-response test, wherein the request includes a context for the challenge-response test;
determining difficulty criteria for the challenge-response test from the context;
selecting a first question response pair that has a difficulty value that satisfies the difficulty criteria for the challenge-response test; and
providing the question from the first question response pair in response to the request.

20. The computer program product of claim 19, wherein the operations further comprise:
obtaining a plurality of unanswered questions, wherein each unanswered question is a question about an entity that has an unknown response;
selecting an unanswered question from the plurality of unanswered questions using the context;
providing the selected unanswered question with the question from the first question response pair in response to the request;
receiving a first user response to the selected unanswered question and a second user response to the question from the first question response pair; and
using the first and second responses to determine a correct response to the unanswered question.

* * * * *